(12) United States Patent
Polston et al.

(10) Patent No.: US 8,566,172 B2
(45) Date of Patent: Oct. 22, 2013

(54) DISTRESSED PROPERTIES MARKETING SYSTEM AND METHOD

(75) Inventors: Stephen M. Polston, Excelsior, MN (US); Aaron Matthew Vennie, Burnsville, MN (US); Jeffrey Matthew Colville, Maple Grove, MN (US); Michelle Patrice Hiller, Elk River, MN (US); Joan Marie Skallman, Excelsior, MN (US)

(73) Assignee: Preferred Home Buyers Network, Inc., Excelsior, MN (US)

( * ) Notice: Subject to any disclaimer, the term of this patent is extended or adjusted under 35 U.S.C. 154(b) by 0 days.

(21) Appl. No.: 13/040,314

(22) Filed: Mar. 4, 2011

(65) Prior Publication Data
US 2012/0059737 A1   Mar. 8, 2012

Related U.S. Application Data

(60) Provisional application No. 61/310,341, filed on Mar. 4, 2010.

(51) Int. Cl.
*G06Q 30/00* (2012.01)

(52) U.S. Cl.
USPC ........................................ 705/26.1; 705/27.1

(58) Field of Classification Search
USPC .............................................. 705/26.1, 27.1
See application file for complete search history.

(56) References Cited

U.S. PATENT DOCUMENTS

| | | | |
|---|---|---|---|
| 5,032,989 A | 7/1991 | Tornetta | |
| 5,584,025 A | 12/1996 | Keithley et al. | |
| 5,664,115 A | 9/1997 | Fraser | |
| 5,754,850 A | 5/1998 | Janssen | |
| 5,794,216 A | 8/1998 | Brown | |
| 5,995,947 A | 11/1999 | Fraser et al. | |
| 6,236,977 B1 | 5/2001 | Verba et al. | |
| 6,321,202 B1 | 11/2001 | Raveis, Jr. | |
| 6,484,176 B1 | 11/2002 | Sealand et al. | |
| 6,519,618 B1 | 2/2003 | Snyder | |
| 6,594,633 B1 | 7/2003 | Broerman | |
| 6,678,663 B1 | 1/2004 | Mayo | |
| 6,684,196 B1 | 1/2004 | Mini et al. | |
| 6,871,140 B1 | 3/2005 | Florance et al. | |

(Continued)

OTHER PUBLICATIONS

Twenty-six compound, Smith, Marc C. Mortgage Banking60. 12 (Sep. 2000): 76-82. Downloaded from ProQuestDirect on the Internet on Mar. 1, 2013, 5 pages.*

(Continued)

*Primary Examiner* — James Zurita
(74) *Attorney, Agent, or Firm* — Beck & Tysver PLLC (57) ABSTRACT

A computerized system and method is presented that allows selling agents to market a listing agent's distressed property listings even though the selling agents work for a different broker than the listing agent. The owner of the property may restrict the selling agents that may market their property. In one embodiment, the owner selects a qualified lender, and the pool of selling agents who may market that property is limited to selling agents who are associated in the computerized system with the qualified lender. The system allows selling agents to schedule open houses for distressed properties listed by the listing agent, with the system preventing two selling agents from scheduling open houses that conflict with one another. The system tracks the marketing activity of agents, which can be used to suggest listing agents to owners, or to restrict the ability of selling agents to market properties.

17 Claims, 3 Drawing Sheets

(56) References Cited

U.S. PATENT DOCUMENTS

| | | | |
|---|---|---|---|
| 6,883,002 | B2 | 4/2005 | Faudman |
| 6,973,432 | B1 | 12/2005 | Woodard et al. |
| 6,985,886 | B1 | 1/2006 | Broadbent et al. |
| 7,016,866 | B1 | 3/2006 | Chin et al. |
| 2001/0032175 | A1 | 10/2001 | Holden et al. |
| 2002/0029194 | A1 | 3/2002 | Lewis et al. |
| 2002/0035520 | A1 | 3/2002 | Weiss |
| 2002/0046077 | A1 | 4/2002 | Mozayeny et al. |
| 2002/0049624 | A1 | 4/2002 | Raveis, Jr. |
| 2002/0052814 | A1 | 5/2002 | Ketterer |
| 2002/0059137 | A1 | 5/2002 | Freeman et al. |
| 2002/0069151 | A1 | 6/2002 | Casper |
| 2002/0077893 | A1 | 6/2002 | Wolf et al. |
| 2002/0095385 | A1 | 7/2002 | McAvoy et al. |
| 2003/0101063 | A1 | 5/2003 | Sexton et al. |
| 2003/0163408 | A1 | 8/2003 | Polston et al. |
| 2003/0187756 | A1 | 10/2003 | Klivington et al. |
| 2004/0030631 | A1 | 2/2004 | Brown et al. |
| 2004/0143450 | A1 | 7/2004 | Vidali |
| 2004/0249705 | A1* | 12/2004 | Spencer et al. .................. 705/14 |
| 2006/0184448 | A1 | 8/2006 | Polston et al. |
| 2009/0192862 | A1* | 7/2009 | Hoggard ........................... 705/9 |

OTHER PUBLICATIONS

Distress spawns a specialty; Segment booms as other sales in area lag, Pakulski, Gary T. The Blade [Toledo, Ohio] Oct. 19, 2008: C.1. Downloaded from ProQuestDirect on the Internet on Mar. 1, 2013, 3 pages.*

Segment booms as other sales in area lag, Pakulski, Gary T. McClatchy—Tribune Business News [Washington] Oct. 19, 2008. Downloaded from ProQuestDirect on the Internet on Mar. 1, 2013, 3 pages.*

Advisory Office Action dated May 2, 2008, U.S. Appl. No. 10/187,207, Polston et al.

Office Action dated Jan. 31, 2007, U.S. Appl. No. 10/187,207, Polston et al.

Office Action dated Feb. 2, 2011, U.S. Appl. No. 10/187,207 Polston et al.

Office Action dated Mar. 1, 2010, U.S. Appl. No. 11/999,299, Polston et al.

Office Action dated Mar. 3, 2010, U.S. Appl. No. 10/187,207, Polston et al.

Office Action dated May 27, 2009, U.S. Appl. No. 10/187,207, Polston et al.

Office Action dated Sep. 14, 2011, U.S. Appl. No. 11/403,385, Polston et al.

Office Action dated Sep. 17, 2010, U.S. Appl. No. 11/999,299, Polston et al.

Office Action dated Oct. 11, 2011, U.S. Appl. No. 12/768,137, Polston et al.

Office Action dated Nov. 13, 2007, U.S. Appl. No. 10/187,207, Polston et al.

* cited by examiner

DISTRESSED PROPERTIES MARKETING SYSTEM AND METHOD

RELATED APPLICATIONS

This application claims the benefit of U.S. Provisional Patent Application No. 61/310,341, filed Mar. 4, 2011, which is incorporated by reference. The present application also has content related to the following U.S. patent application Ser. No. 10/187,207, filed Jul. 1, 2002 (entitled "Computerized System and Method for Exchanging Information Between a Buyer, Seller, and Lender"); Ser. No. 11/403,385, filed Apr. 12, 2006 (entitled "A Computerized System for Managing Communications Between a Buyer, Seller, and Lender"); Ser. No. 11/999,299, filed Dec. 4, 2007 (entitled "Communication System and Method Between a Home Buyer, Seller, Strategic Business Source, and Lender"); and 61/214,781, filed Apr. 28, 2009 (entitled "Agent Referral System and Method With Integrated Buyer, Lender, and Agent Communication System"). Each of these related applications is hereby incorporated by reference.

FIELD OF THE INVENTION

The present application relates to the field of automated systems that assist in the marketing of real estate properties. More particularly, the described embodiments relate to computerized systems that allowed shared marketing of distressed properties between real estate agents working for different brokers.

SUMMARY

One embodiment of the present invention includes a computerized system where a bank or other seller has one or more distressed properties that they wish to sell. Traditionally, the owner will list their properties with one or more listing brokerages, with each brokerage only allowing agents affiliated with that brokerage to market their properties. With the present invention, the owner instructs their listing agent to allow certain agents (known as the "selling agents") to market the properties. In one described embodiment, the owner has the option to control the pool of selling agents who are allowed to market the owner's properties.

DETAILED DESCRIPTION

Sale of Distressed Properties

When a homeowner falls behind on their mortgage, the lender holding the mortgage may begin foreclosure proceedings. When a house has entered foreclosure, the lender has given notice to the homeowner that unless the mortgage payments are brought up to date, the lender will auction off the property in order to raise money for the repayment of the loan. If the foreclosure auction fails to raise sufficient funds to pay of the outstanding debt on the mortgage loan, the lender will usually retain ownership of the property. These lender or bank-owned properties are often referred to as Real Estate Owned (or REO) properties. The lender typically will sell their REO properties through normal real estate channels by hiring a listing real estate agent to handle the sale of the properties.

As an alternative to entering the foreclosure process, the lender may negotiate for the homeowner to sell the home in a short sale. In a short sale, the homeowner attempts to sell their property for less than the outstanding amount on the mortgage. The proceeds of the sale are then remitted to the mortgage holding lending institution.

Because banks have particular requirements for how their REO and short sale properties (collectively referred to as "distressed properties") are sold, these entities generally prefer that the sales be handled by listing brokers familiar with the process. Recently, because decreasing home values have caused an increase in home foreclosures, many banks have developed a large inventory of REO and other distressed properties. While all of these properties can be listed through a listing agency or brokerage specializing in distressed properties, the sheer volume of such properties often means that the listing agent has insufficient time to individually market each of the properties that they have listed. The embodiments of the present invention described below assist banks and other owners of distressed properties get their properties sold by increasing the marketing that is performed for each property. Furthermore, these embodiments help build a pool of potential buyers for the distressed properties owned by the financial institution.

Basic Configuration

Figure 1:
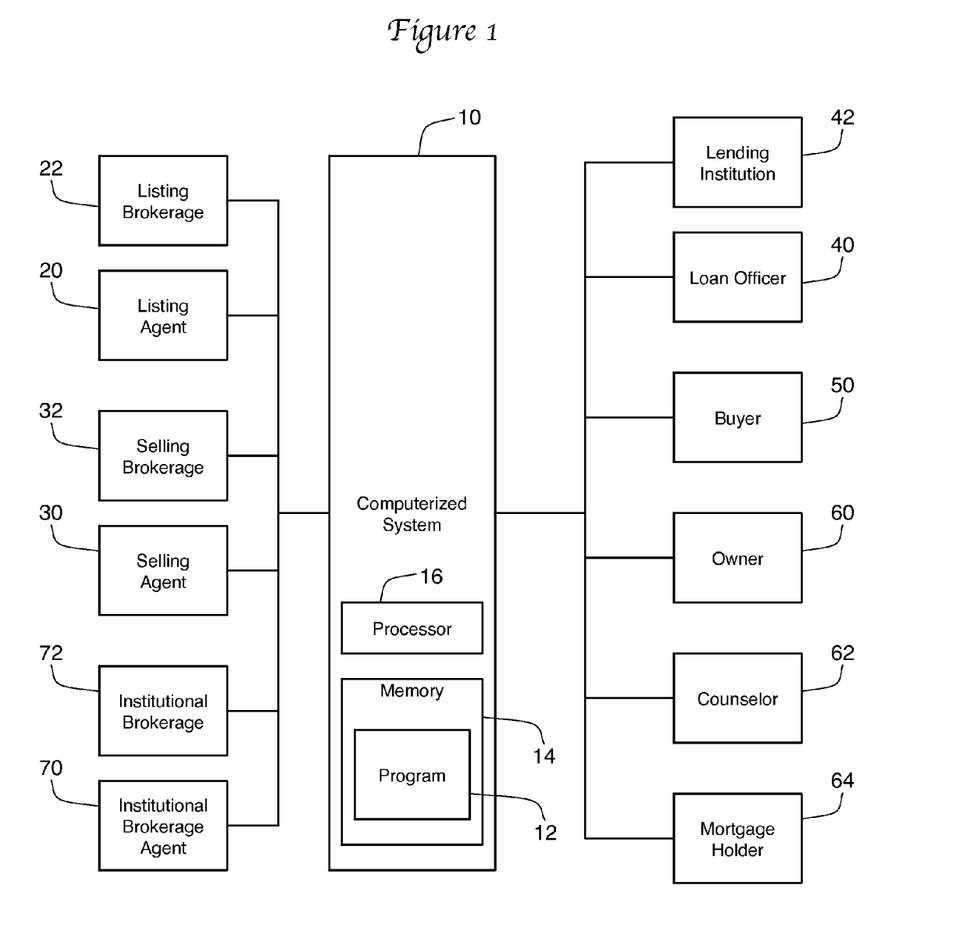
FIG. 1 is a block diagram showing the major parties using a computerized system that operates the described embodiments of the present invention.

FIG. 1 is a block diagram of one embodiment of the present invention, showing a computerized system 10 for facilitating communication and business relationships between the various parties involved in the marketing and sale of real property. The computerized system 10 is designed to work with a listing agent 20, a selling agent 30, a mortgage lender or loan officer 40, a potential buyer of the real estate 50, and the owner 60 of the real estate. In addition to these participants, the system 10 could also allow interaction with additional parties as well. For instance, properties involved in a short sale often have second mortgages, mechanics lines, homeowner association liens, and other lien holders with claims on the properties. The owners 60 of these properties will often designate an experienced counselor 62 to negotiate the removal of these liens and assist the owner in the short sale of the property. These counselors 62 may use the system 10 to help the owner 60 get the property in condition to sell and also to assist the owner 60 of a particular property in their use of the system 10. Furthermore, where the owner 60 is an individual property owner involved in a short sale, the system 10 may also provide an interface for the mortgage holder 64 to utilize the system 10 to track the marketing efforts made in connection with their properties. The mortgage holder 64 may be an investor that provided or purchased the mortgage loan, or a loan servicing organization that handles the mortgage for the loan owner. Note that while this document discusses the security interest on a home as a "mortgage," this term should be read broadly to include other similar financial instruments such as a deed of trust.

In some jurisdictions, a distinction is made between an agent who is licensed to sell real estate and a broker who is allowed to operate their own real estate brokerage and hire additional agents to help sell real estate. For example, most MLS organizations require that their participants be real estate brokers, with agents subscribing to the MLS listing data through their relationship with a broker. Often, a broker will hire numerous agents, with the agents within one brokerage frequently working together to assist one another in the marketing and selling of properties listed through that the brokerage. In the block diagram of FIG. 1, the listing agent 20 is shown as belonging to a listing brokerage 22, while the selling agent 30 is shown as belonging to a different, selling brokerage 32. While it is not required that the listing and selling brokerages 22, 32 be separate, one of the advantages of this embodiment of the invention is that it allows selling agents 30 from a completely different brokerage 32 to market properties listed by the listing agent 20. As shown in FIG. 1, the lender 40 will usually work with a lending institution 42.

In some embodiments the computerized system 10 is operating in conjunction with an institutional brokerage 72, which may have one or more affiliated brokerage agents 70. This institutional brokerage 72 is a fully function real estate brokerage, and the agents 70 affiliated with this brokerage 72 are licensed to list and sell real estate property. The institutional brokerage 72 is different from the listing brokerage 22 and the selling brokerage 32 in that the computerized system 10 is either run by the institutional brokerage 72 or by an affiliated corporate entity.

The computerized system 10 includes a set of instructions and interfaces embodied on a computer readable medium for execution on a digital processor. One example is a computer program 12 stored on a non-transitory, tangible memory device 14, such as a hard drive, RAM, PROM, flash memory, or some other form of programmable, physical memory. The computer system 10 also includes at least one processor 16 for operating the computer program. For example, the processor could be a microprocessor manufactured by Intel Corporation of Santa Clara, Calif., or Advanced Micro Devices, Inc. of Sunnyvale, Calif. Alternatively, the computerized system 10 could be a network of computers all operating according to the instructions of the computer program 12. The various parties communicate with the computerized system 10 through a wide area network such as the Internet. This could be accomplished by using the computer program 12 to operate a web server, which requires the parties to access the program through a web browser operating on a local computing device attached to the Internet. The various parties identify themselves to the web server through a log-in process, and the web server presents to the browser an interface that is specific to the user logging in.

Implementation of System 10

Figure 2:
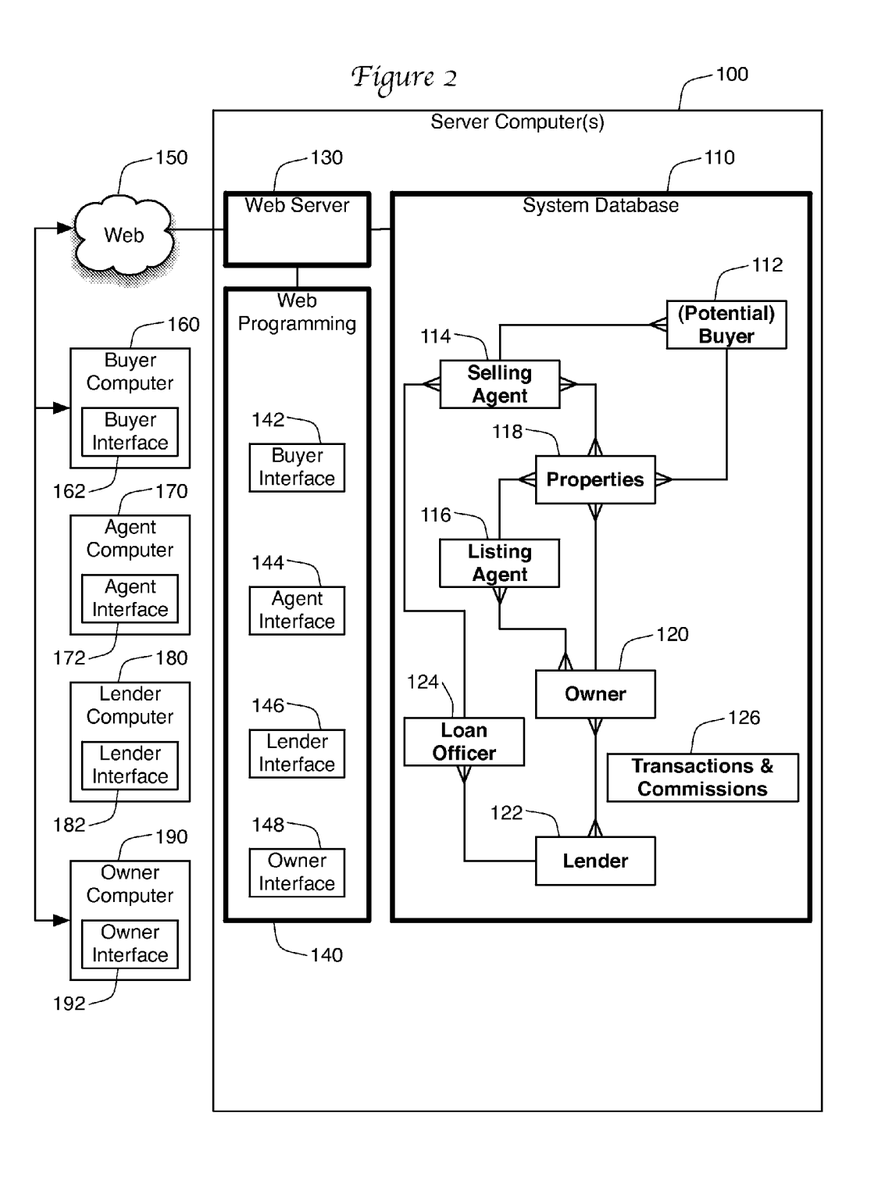
FIG. 2 is a block diagram showing one or more server computers operating a web server to present interfaces over the World Wide Web.

The computerized system 10 is capable of storing information about all of the parties that use the system 10. In the preferred embodiment, this information is stored in a database 110 operating on one or more server computers 100, as shown in FIG. 2. The information about the parties can be stored in pre-defined fields in a database table (or database objects in an object-oriented database environment) within the database 110. FIG. 2 shows the database with tables or objects for buyers 112, selling agents 114, listing agents 116, properties 118, owners 120, lenders 122, and loan officers 124. Relationships between these entities 112-124 are represented in FIG. 2 using crow's foot notation. Although not shown as separate database entities in FIG. 2, the database 110 also includes information about the listing brokerages 22 employing the listing agents 20, the selling brokerages 32 employing the selling agents 30, and the lending institutions 42 employing the loan officers 40.

The database 110 can keep track of the fact that owners 120 are related to properties 118. The owners 120 can hire listing agents 116 to list an individual property 118. As explained below, selling agents 114 can also become associated with properties 118 in the database 110 by agreeing to assist in the marketing of those properties 118. The marketing of the properties may include the placing of advertisements in newspapers and online (such as in the Craigslist.org website), the inclusion of the properties in a printed publication, and the holding of open houses. In one embodiment, the owner 120 can select a qualified lender 122. Preference for selling agents 114 associated with the qualified lender 122 can be given for properties 118 owned by a particular owner 120. One way to associated a selling agent 114 and a lender 122 is to associate the lender 122 with a plurality of loan officers 124, and then associate each selling agent with one of the loan officers 124. Alternatively, this association can be directly between a selling agent 114 and a lender 122. In one embodiment, selling agents 114 that are marketing the property 118 can also market to individual buyers 112 that are considering the purchase of that property 118. With the aid of the server computers 100 and the system database 110, such marketing to buyers 112 can take place through system 10.

One benefit of using the database 110 is that the system 10 is able to track how each party uses the system 10 in the marketing of the properties 118. Steps taken by a selling agent 114 or a listing agent 116 in relation to a property 118 can be recorded and shared with the other parties interested in that property 118. In this way, notes input into the system about a property 118 by a selling agent 114 may be immediately viewable by a listing agent 116, and vise versa. Furthermore, the listing agent 116, owner 120, or other interested party can track the marketing activities performed by each of the selling agents 114 marketing a property 118 to ensure that the property 118 is being properly promoted.

In addition, the database 110 is able to keep track of purchase transactions made by buyers 112. This allows the system database 110 to also track commission fees that may be due as a result of relationship between the listing agent and the selling agent. The tracking of transactions and commission fees is shown as a single entity 126 in database 110. This should not be taken to indicate that this data would in fact be implemented as a single database table or object, but merely to indicate that one or more database entities are created within database 110 to track this information. Furthermore, none of the entities shown within database 110 in FIG. 5 should be considered to show actual implementation details of the database 110, since it is well within the scope of the art to implement this type of data using a variety of entity architectures.

The database 110 is used by a web server 130 operating on one or more of the server computers 100 to generate the various interfaces used by the system 10. In particular, web programming 140 exists that define how to create a buyer interface 142, an agent interface 144, a lender interface 146, and an owner interface 148 using the data in the database 110. This programming 140 allows the web server 130 to transmit over the World Wide Web 150 a buyer interface 162 that can be seen by a browser operating on a computer 160 for the benefit of a buyer 20. Similarly, the web server 130 can manage an agent interface 172 on a browser operating on an agent computer 170, a lender interface 182 on a browser operating on a lender computer 180, and an owner interface 192 operating on an owner computer 190. The computer 160-190 can be traditional personal computers, or can be any other type of computing device capable of presenting a web-based interface including a smart phone or a tablet or netbook computer.

Method

Figure 3:
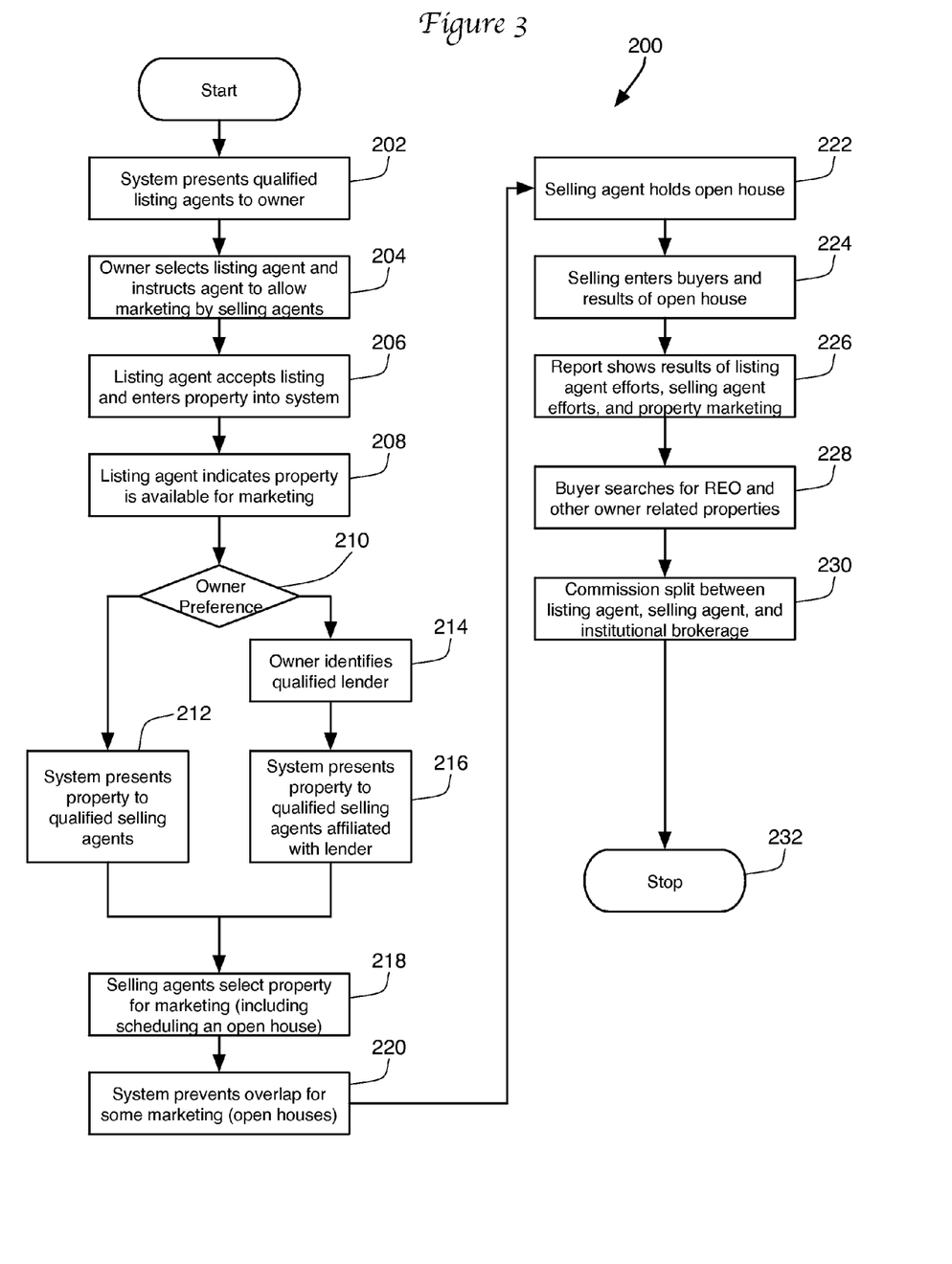
FIG. 3 is a flow chart showing a method of implementing one embodiment of the present invention.

The computerized system 10 as implemented in database 110 is used to implement the method 200 as shown in the flowchart of FIG. 3. The method 200 starts at step 202, with the system 10 providing the owner 60 (through the owner interface 192) a list of listing agents 20 that are qualified to handle distressed properties in a particular geographic area. This list of agents 20 would be especially useful for owners 60 of a single property that are working with their mortgage holder to offer the property for sale in a short sale. History has shown that when professionals inexperienced with these transactions handle short sale listings, potential sales transactions have a high rate of failure. Consequently, the provision of a list of listing agents experienced in these types of transactions to individual homeowners is highly beneficial to both the homeowners and the mortgage holders. The displaying of qualified, distressed property listing agents in step 202 is also useful to owners that hold multiple properties, such as banks or other financial institutions owning REO properties. It is important for these owners to ensure that their listing agents 20 can handle a large volume of distressed properties simultaneously.

In order to best sell these types of distressed properties, the listing agents 20 should be familiar with the intricacies of handling a short sale or the sale of other distressed properties. In addition, it is important that the listing agent 20 be familiar with the marketplace for that property, including the selling details of similar properties in that neighborhood. The present invention can track numerous potential listing agents 20 by experience in selling distressed properties, experience in the property's neighborhood, and experience with a particular price and style of property. In addition, because the system 10 tracks the effectiveness of the marketing efforts undertaking to sell each property, the system 10 is able to also track the ability of individual listing agents 20 to obtain offers on the properties that they have listed. Step 202 examines all of this information, and then presents the list of qualified listing agents 60 based on these criteria. The owner 60 then selects the listing agent 20 at step 204. In so selecting the listing agent 20, the owner 60 is also instructing the listing agent 20 that the property should be available for marketing by selling agents 30. In most cases, the owner 60 will desire that selling agents 30 market their property because it will increase the marketing that can take place on the property and therefore should decrease the amount of time it takes to sell the property.

Upon receiving the listing, the listing agent 20 will formally accept the listing at step 206. After accepting the listing, the listing agent 20 also enters details about the property using the agent interface 172. In one embodiment, the system 10 is operated in conjunction with an institutional brokerage 72. In accepting the listing of the property, the listing agent 20 also acknowledges that the referral for this property came through the system 10 of the institutional brokerage 72. As the institutional brokerage 72 is a fully functional real estate brokerage, it is eligible to receive a referral fee for referrals to listing agents 20. In accepting the listing of the property at step 206, the listing agent 20 may further agree to share a referral fee with the institutional brokerage 72 running the system 10.

In step 208, the listing agent 20 uses the agent interface 172 to indicate that selling agents 30 are eligible to market the listed property. The system 10 is designed to track numerous selling agents 30 who are interested in marketing the properties listed by others. The goal of the system 10 is to ensure that the pool of selling agents 30 for a particular property is limited to those who i) understand the intricacies of selling distressed properties, ii) have agreed that they are not the listing agent and have permission from the listing agent to perform marketing activities as applicable for local, state and national rules, regulations, statutes and laws, and iii) are approved by the owner 60. Owners 60 may be particular about which selling agents 30 may market their property given the complexity of completing a distressed property purchase transaction. For example, the buyers 50 of these properties will usually need to secure mortgage financing to complete the purchase. In most cases, the owner 60 wants to be assured that accepted purchase offers are backed by adequate financing. Far too often, house sales fall apart because the mortgage lender that was financing the purchase is unable to complete the transaction. In the last few years, hundreds of mortgage-related lenders have ceased operations, which has affected thousands of house sale transactions.

To limit such issues, many owners 60 desire to have potential purchasers use mortgage providers that are familiar to the owner 60. The disclosed embodiment is designed to encourage potential buyers to engage with one of these known lenders (referred to as "qualified lenders") in part by limiting the buyer's agents that are allowed to market the homes. Referring back to FIG. 2, the database 110 facilitates this by associating the owner 120 with one or more qualified lenders 122. The qualified lender 122 selected by the owner 120 uses the computerized system 10 to associate their loan officers 124 with particular real estate agents 114. In its use of system 10, the owner 120 is allowed to require that only selling agents 114 that are linked through the database 110 to loan officers 124 of the qualified lender 122 are able to use the system 10 to market properties provided by that owner 60. Alternatively, the database 110 can be designed to associate selling agents 114 with the qualified lender 122 in ways other than through the lender's individual loan officers 124, such as through a direct association from selling agent records 114 and the lender record 122. The incorporated patent applications identified above describe several computerized systems in which agents are associated with loan officers, any of which could be used to implement this system.

Returning to FIG. 3, the method 200 examines the owner's preference in step 210. If the owner desires, the system 10 will present in step 212 the opportunity to market the property to selling agents 30 regardless of their affiliation with a particular lender 122 in the database 110. Of course, the system 10 would still ensure that the selling agents 30 have agreed to the appropriate contractual obligations, are qualified to sell distressed properties, and are skilled in marketing properties in the appropriate geographic location. Alternatively, the owner's preference may indicate a desire to limit the pool of selling agents 30 to those associated with their qualified lender 40. If so, the method advances to step 214 in which the owner identifies their qualified lender 40. This identification occurs through use of the owner's interface 192, and can take place even before the property is listed with the listing agent 20. The system 10 will then limit the opportunity to market the property to qualified selling agents 30 associated with the identified lender 40 in the database 110.

The appropriate selling agents 30 are then presented the opportunity to view properties that they are allowed to market (in steps 212 and 216). This opportunity will be presented in the agent interface 172 at step 218. Both the listing agent 20 and the selling agent 30 are able to use the agent interface 172 since the agent interface is customized for each agent 20, 30 according to their login account. One unique aspect of the agent interface 172 is that selling agents 30 are able to view properties available for marketing on the system 10, and then schedule a selected property for advertising or for an open house using an automated calendaring system. When multiple selling agents 30 are authorized to market a property, the system 10 will ensure that the scheduled open houses or other marketing events will not overlap, which is shown in step 220 of method 200.

The selling agent 30 will then hold the open house or other marketing activity at step 222. After the open house is completed, the selling agent 30 is required to enter the results of the open house back into the system 10 (step 224). This allows the success of the sales activities to be measured through statistics that are then reported out at step 226. Statistics that can be reported out include the number of open houses or other marketing activities for each property, the number of prospective purchasers who attended the open house, the number of offers made on the property as a result of the marketing activities, the number of prospective purchasers who have been entered into the system 10 as a result of such marketing (see below), and the mortgage application status of those prospective purchasers. These statistics can be provided to any of the parties with access to the system 10, including owners 60, counselors 62, mortgage holders 64, the loan officer 40 and the management of the lending institution 42, the selling agents 30 and the selling brokerage management 32, and the listing agents 20 and the listing brokerage management 22.

In step 224, the selling agent 30 would also enter information into the system 10 about potential buyers 50 that attended the open house. This allows the selling agent 30 to market their services and also to market other distressed properties to those buyers 50. Such marketing efforts are extremely valuable to the selling agents 30, as they allow the selling agent 30 to service a buyer 50 and earn a commission even if those buyers are not interested in purchasing the particular property shown at that open house. Buyers 50 entered into the system 10 are associated with their selling agent 30 in the database 110, and through that association also with a particular loan officer 40 that works with that selling agent 30. Once entered and authorized to use the system 10, buyers 50 may use the system 10 to search for real property information through the buyer interface 162. By using that interface 162, the buyer 50 will also be exposed to the name and contact information of both the selling agent 30 that entered them into the system and the qualified lender's loan officer 50 that is affiliated with that agent 30.

Frequently, a financial institution that is selling property will give special incentives to a buyer 50 if the buyer finances their home purchase with their qualified lender 40. For instance, some banks will refund two points at closing if the purchase of one of their REO properties is financed through their affiliated or preferred financing institution. To take full advantage of this opportunity, the buyer interface 162 allows the buyer 50 to search for all REO properties (and related short sales) that are owned by the owner 60 and then see the search results on a custom map or list showing the locations of these properties (step 228). To track which owner 60 should be used for a particular buyer 112, the system can track which open house the buyer 50 attended when they were entered into the database 110, and then limit searches to other properties owned by the owner 60 of that open house property (the buyer's associated owner). The buyer interface 162 may also allow the buyer 50 to search for all REO or distressed properties regardless of the particular owner 60 of those properties. Even when such searches are permitted, the system 10 could be designed to prevent buyers from narrowing their search for only those REO properties owned by a particular bank or other owner that is different from their associated owner 60.

Upon the sale of a property to a buyer 50, the system 10 can help track the splitting of commissions and referral fees at step 230. For example, a referral fee may be owed to the institutional brokerage 72 that referred the owner 60 to the listing agent 20 through system 10. Furthermore, the commission may be split between the listing agent 20 and the selling agent 30. This information is tracked in the database 110 and shared with the parties at step 228.

The system 10 may include the institutional brokerage agents 70 that work for the institutional brokerage 72 within the list of listing agents 20 presented in step 202 and available for selection in step 204. Furthermore, the system 10 may allow the institutional brokerage agents 70 to select properties for marketing as selling agents 30 in step 218. In some embodiments, preference may even be granted to institutional brokerage agents 70 over agents from other brokerages 22, 32 in these steps 202, 218. Such arrangements would allow the institutional brokerage 72 to collect a higher percentage of the real estate commissioned earned on the sale of a property.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computer implemented method of marketing properties comprising:
    a) generating an owner interface at a server computer, the owner interface being displayed on a first computing device to an owner of a property, the owner interface providing:
        i) a list of listing agents, wherein the owner can select a particular listing agent from the list of listing agents to list the property, and
        ii) an indication of a qualified lender;
    b) generating a listing agent interface at the server computer, the listing agent interface being displayed on a second computing device to the particular listing agent selected by the owner, the listing agent interface providing:
        i) an input to indicate that the property is available to be marketed by selling agents; and
    c) generating a selling agent interface at the server computer, the selling agent interface being displayed on a plurality of selling agent computing devices used by a plurality of selling agents, the selling agent interface displaying the property as available for marketing to a first subset of the plurality of selling agents and not displaying the property as available for marketing to a second subset of the plurality of selling agents, wherein the first subset of selling agents are associated with the qualified lender in a database operating on the server computer, and the second subset of selling agents are not associated with the qualified lender in the database.

2. The computer implemented method of claim 1, further comprising:
    d) associating a sale of the property with both the particular listing agent and a successful selling agent that successfully sold the property, and further tracking a commission that is to be split between the particular listing agent and the successful selling agent.

3. The computer implemented method of claim 2, wherein the selling agent interface includes an input to indicate a selected time for a marketing activity to be undertaken by a particular selling agent relating to the property, wherein the selling agent and listing agent interfaces prevent any other agent from scheduling a marketing activity at the selected time.

4. The computer implemented method of claim 3, further comprising tracking by the server computer of marketing activities undertaken by the particular listing agent and the selling agents in the first subset of selling agents.

5. The computer implemented method of claim 4, further comprising a buyer interface that allows buyers to search for and obtain information about properties for sale.

6. The computer implemented method of claim 5, wherein the selling agent interface further includes a buyer record input to allow selling agents to input buyer records into the server computer, wherein buyers associated with the buyer records are granted access to the buyer interface.

7. The computer implemented method of claim 6, wherein at least one buyer record input into the server computer by the particular selling agent is associated with at least one marketing activity undertaken for the property.

8. The computer implemented method of claim 7, further comprising tracking by the server computer of statistics relating to the marketing activities of the selling agents including a number of buyer records input into the server computer associated with the marketing activities.

9. The computer implemented method of claim 8, wherein the statistics are presented on the listing agent interface and the owner interface.

10. The computer implemented method of claim 9, wherein additional statistics are tracked by the server computer relating to the listing agents including statistics relating to successful sales of properties listed with the listing agents.

11. The computer implemented method of claim 10, wherein the additional statistics are used to determine which listing agents are presented on the owner interface.

12. The computer implemented method of claim 1, wherein the server computer comprises a plurality of physical computers operating as the server computer.

13. The computer implemented method of claim 1, further comprising:
　d) providing an open house scheduling input through the selling agent interface for scheduling an open house for the property, wherein the open house scheduling input ensures that there is no conflict between multiple open houses scheduled for the property by differing selling agents.

14. The computer implemented method of claim 1 further comprising:
　d) using the server computer to operate the database by maintaining database records on a non-transitory computer readable memory, the database further comprising:
　　i) a plurality of owner records each containing information that identifies a different property owner,
　　ii) a plurality of real estate property records each containing information that identifies a different real estate property,
　　iii) first linking information linking a first real estate property record with a first owner record,
　　iv) a plurality of lender records each containing information that identifies a different lender,
　　v) second linking information linking a first lender record with the first owner record,
　　vi) a plurality of listing agent records each containing information identifying a different listing real estate agent,
　　vii) third linking information linking a first listing agent record with the first real estate property record,
　　viii) a plurality of selling agent records each containing information that identifies a different selling agent willing to market the different real estate properties, and
　　ix) fourth linking information linking the first lender record with a first subset of selling agent records, wherein a second subset of selling agent records is not linked with the first lender record via the fourth linking information.

15. The computer implemented method of claim 14, wherein the database further comprised:
　x) fifth linking information linking the second subset of selling agent records to lender records other than the first lending record.

16. The computer implemented method of claim 15, wherein all the selling agent records are linked via linking information to at least one lender record.

17. The computer implemented method of claim 14, wherein the database maintained by the server computer further comprises:
　x) a plurality of brokerage records each containing information identifying a real estate brokerage that employs selling agents and listing agents,
　xi) fifth linking information linking the first listing agent record with a first brokerage record, and
　xii) sixth linking information linking a first selling agent record in the first subset of selling agent records with a second brokerage record, wherein the first and second brokerage records identify different real estate brokerages.

* * * * *

UNITED STATES PATENT AND TRADEMARK OFFICE
CERTIFICATE OF CORRECTION

| | | |
|---|---|---|
| PATENT NO. | : 8,566,172 B2 | Page 1 of 1 |
| APPLICATION NO. | : 13/040314 | |
| DATED | : October 22, 2013 | |
| INVENTOR(S) | : Polston et al. | |

It is certified that error appears in the above-identified patent and that said Letters Patent is hereby corrected as shown below:

In the Specification
Column 1
Line 7
Delete "Mar. 4, 2011," and insert --Mar. 4, 2010,--, therefor.

Signed and Sealed this
Fifteenth Day of July, 2014

Michelle K. Lee
*Deputy Director of the United States Patent and Trademark Office*